United States Patent [19]
Yamashita et al.

[11] Patent Number: 5,407,023
[45] Date of Patent: Apr. 18, 1995

[54] SLIP CONTROL SYSTEM FOR VEHICLE

[75] Inventors: Tetsuhiro Yamashita; Kenji Hirai, both of Hiroshima, Japan

[73] Assignee: Mazda Motor Corporation, Hiroshima, Japan

[21] Appl. No.: 186,600

[22] Filed: Jan. 26, 1994

[30] Foreign Application Priority Data

Feb. 3, 1993 [JP] Japan ................................. 5-40578

[51] Int. Cl.6 ............................................. B60K 28/16
[52] U.S. Cl. ............................ 180/197; 364/426.01
[58] Field of Search ................. 180/197; 364/426.01, 364/426.03, 426.02

[56] References Cited

U.S. PATENT DOCUMENTS

| | | | |
|---|---|---|---|
| 4,750,125 | 6/1988 | Leppek et al. | 180/197 |
| 4,848,851 | 7/1989 | Kuraoka et al. | 364/426.01 |
| 5,140,524 | 8/1992 | Matsuda | 180/197 |
| 5,225,984 | 7/1993 | Nakayama | 180/197 |
| 5,265,020 | 11/1993 | Nakayama | 180/197 |
| 5,305,218 | 4/1994 | Ghoneim | 364/426.03 |

FOREIGN PATENT DOCUMENTS 215430  9/1988  Japan ................................. 180/197

Primary Examiner—Margaret A. Focarino
Assistant Examiner—Kevin Hurley
Attorney, Agent, or Firm—Sixbey, Friedman, Leedom & Ferguson

[57] ABSTRACT

A traction control system for a vehicle controls the torque transmitted to the road surface so that the amount of slip of the driving wheels converges on a target value when the amount of slip of the driving wheels exceeds a predetermined threshold value. When the vehicle is making a turn, the amounts of slip of the driving wheels are calculated and the calculated amounts of slip are corrected with correction values for correcting the amounts of slip of the inner and outer driving wheels taking into account the difference between the wheel speed of the inner driving wheel and that of the outer driving wheel during turning. The correction values are calculated on the basis of the actual radius of turn and the vehicle speed which are calculated on the basis of the wheel speeds of the driven wheels detected by the wheel speed detecting means.

8 Claims, 9 Drawing Sheets

SLIP CONTROL SYSTEM FOR VEHICLE

BACKGROUND OF THE INVENTION

1. Field of the Invention

This invention relates to a slip control system for a vehicle, and more particularly to a slip control system for a vehicle in which the slip control is effected during turning taking into account the difference in the rotational speed between the inner driving wheel and the outer driving wheel.

2. Description of the Prior Art

There has been put into practice a traction control system which detects the amount of slip of the driving wheels and controls the engine output and/or application of braking force to the wheels so that the amount of slip of the driving wheels converges on a target value, thereby preventing deterioration of acceleration of the vehicle due to an excessive driving torque transmitted to the driving wheels. Many vehicles are provided with a traction control system as well as an anti-skid brake system. See, for instance, Japanese Unexamined Patent Publication No. 1(1989)-197160.

When the vehicle is making a turn, the wheel speed of the outer driving wheel becomes higher than that of the inner driving wheel and accordingly the apparent amount of slip of the outer driving wheel becomes larger. It is not preferred that the slip control is effected on the basis of the large apparent amount of slip.

In Japanese Unexamined Patent Publication No. 62(1987)-60937, there is disclosed a traction control system in which the detected amount of slip is corrected taking into account the difference in the rotational speed between the inner driving wheel and the outer driving wheel during turning.

When the detected amount of slip is corrected taking into account the difference in the rotational speed between the inner driving wheel and the outer driving wheel, an ideal radius of turn is first calculated on the basis of the steering angle detected by a steering angle sensor and the detected amount of slip is corrected on the basis of the ideal radius of turn. However since the actual turning behavior of the vehicle is slightly behind the change in the detected steering angle, there arises a problem that the correction of the detected amount of slip can be effected prematurely before the actual behavior of the vehicle.

SUMMARY OF THE INVENTION

In view of the foregoing observations and description, the primary object of the present invention is to provide a slip control system for a vehicle in which the correction of the detected amount of slip can be effected in time to the actual behavior of the vehicle.

The slip control system for a vehicle in accordance with the present invention comprises a traction control means for effecting traction control in which the amount of slip of the driving wheels of the vehicle relative to the road surface is detected and the torque transmitted to the road surface is controlled when the amount of slip of the driving wheels exceeds a predetermined threshold value so that the amount of slip of the driving wheels converges on a target value and characterized by having a wheel speed detecting means which detects the wheel speeds of the four wheels of the vehicle including driving wheels and driven wheels, a slip calculating means which calculates the amounts of slip of the driving wheels on the basis of the wheel speeds detected by the wheel speed detecting means, a correction value calculating means which, when the vehicle is making a turn, calculates the vehicle speed and the actual radius of turn on the basis of the wheel speeds of the driven wheels detected by the wheel speed detecting means and calculates, on the basis of the actual radius of turn and the vehicle speed thus obtained, correction values for correcting the amounts of slip of the inner and outer driving wheels calculated by the slip calculating means taking into account the difference between the wheel speed of the inner driving wheel and that of the outer driving wheel during turning, and a correcting means which corrects the amounts of slip of the inner and outer driving wheels calculated by the slip calculating means respectively with the correction values calculated by correction value calculating means.

In the slip control system of the present invention, since the amounts of slip of the driving wheels detected during turning are determined on the basis of the vehicle speed and the actual radius of turn, the correction of the detected or apparent amount of slip can be effected in time to the actual behavior of the vehicle, thereby improving the reliability and the accuracy of the slip control.

In one preferred embodiment of the present invention, the slip control system is further provided with a lateral acceleration calculating means which calculates an ideal radius of turn on the basis of the steering angle detected by a steering angle sensor, calculates the vehicle speed on the basis of the wheel speeds detected by the wheel speed detecting means and calculates the lateral acceleration of the vehicle on the basis of the ideal radius of turn and the vehicle speed thus calculated, and a lateral-acceleration-based correcting means which calculates a correction coefficient on the basis of the lateral acceleration calculated by the lateral acceleration calculating means and corrects the threshold value and the target value for the traction control with the correction coefficient when it is determined that the understeer tendency of the vehicle is high according to the condition of the road surface and the running condition of the vehicle.

When the lateral acceleration of the vehicle is calculated on the basis of the actual radius of turn, the lateral acceleration becomes small when the understeer tendency of the vehicle is high and accordingly the threshold value and the target value cannot be sufficiently small. Such a problem can be overcome by calculating the lateral acceleration on the basis of the ideal radius of turn when the understeer tendency of the vehicle is high.

DESCRIPTION OF THE PREFERRED EMBODIMENT

Figure 1:
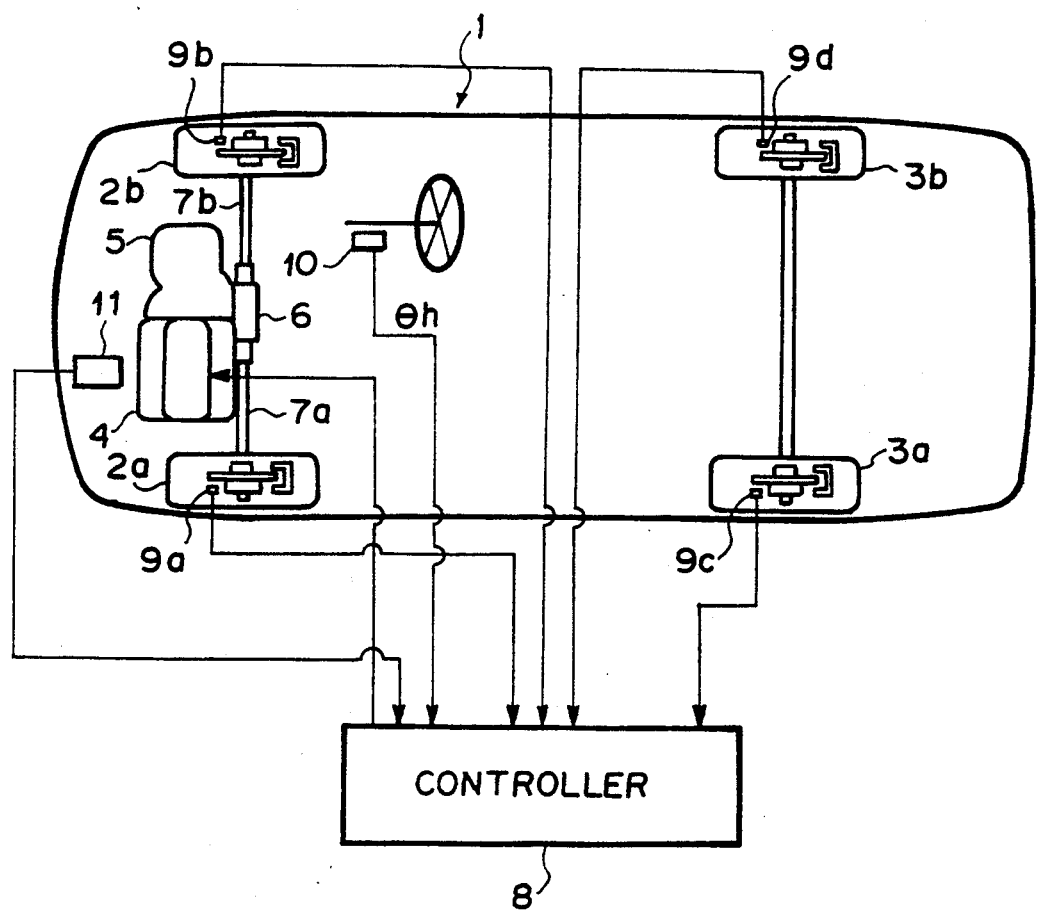
FIG. 1 is a schematic view of a vehicle provided with a slip control system in accordance with an embodiment of the present invention.

In FIG. 1, a vehicle 1 provided with a slip control system in accordance with an embodiment of the present invention has left and right front wheels 2a and 2b and left and right rear wheels 3a and 3b. Driving torque output from a V-6 engine 4 is transmitted to the left and right front wheels 2a and 2b through an automatic transmission 5, a differential 6 and left and right drive shafts 7a and 7b. That is, in the vehicle 1, the front wheels 2a and 2b are the driving wheels and the rear wheels 3a and 3b are the driven wheels.

A controller 8 effects fuel injection control and ignition timing control of the engine 4 and slip control (traction control) of the vehicle 1. The controller 8 has an engine control section for effecting the fuel injection control and the ignition timing control and a slip control section for effecting the slip control. Detecting signals from wheel speed sensors 9a to 9d which respectively detects the speeds of the wheels 2a, 2b, 3a and 3b, a steering angle sensor 10 which detects the turning angle of a steering wheel, an engine speed sensor 11 and brake sensors which respectively detect braking conditions on the wheels 2a, 2b, 3a and 3b are input into the controller 8.

The controller 8 comprises an input interface for receiving the detecting signals from the sensors described above, a pair of microcomputers including CPU, ROM and RAM, an output interface, driving circuits for a igniter and fuel injection valves and the like. In the ROM of the microcumputer for the engine control section are stored control programs for the fuel injection control and the ignition timing control and tables and maps for the same. In the ROM of the microcumputer for the slip control section are stored control programs for the slip control and tables and maps for the same. In the RAM there are provided various memories, soft counters and the like.

The slip control effected by the slip control section of the controller 8 will be briefly described, hereinbelow. The slip control section first calculates the actual radius of turn Rr, the steering-angle-based radius of turn Ri (to be described later), the vehicle speed V (speed of the vehicle body) and the friction coefficient μ of the road surface on the basis of the detecting signals from the sensors described above. Then the slip control section calculates the lateral acceleration G and calculates on the basis of the lateral acceleration G a correction coefficient k for correcting a threshold value for determination of slip and a target control value T so that they are reduced as the lateral acceleration G increases.

Then the slip control section calculates the amount of slip, effects determination of slip, sets the target control value T and calculates a control level FC for controlling the engine output and outputs a control signal for the slip control to the engine control section.

The slip control in this embodiment is characterized in that the detected amount of slip is corrected during turning by a wheel-speed-difference-based correction value which is determined on the basis of the actual radius of turn and the vehicle speed so that the correction of the detected amount of slip can be effected in time to the actual behavior of the vehicle.

The slip control (traction control) performed by the slip control section will be described with reference to FIGS. 2 to 11, hereinbelow.

Figure 2:
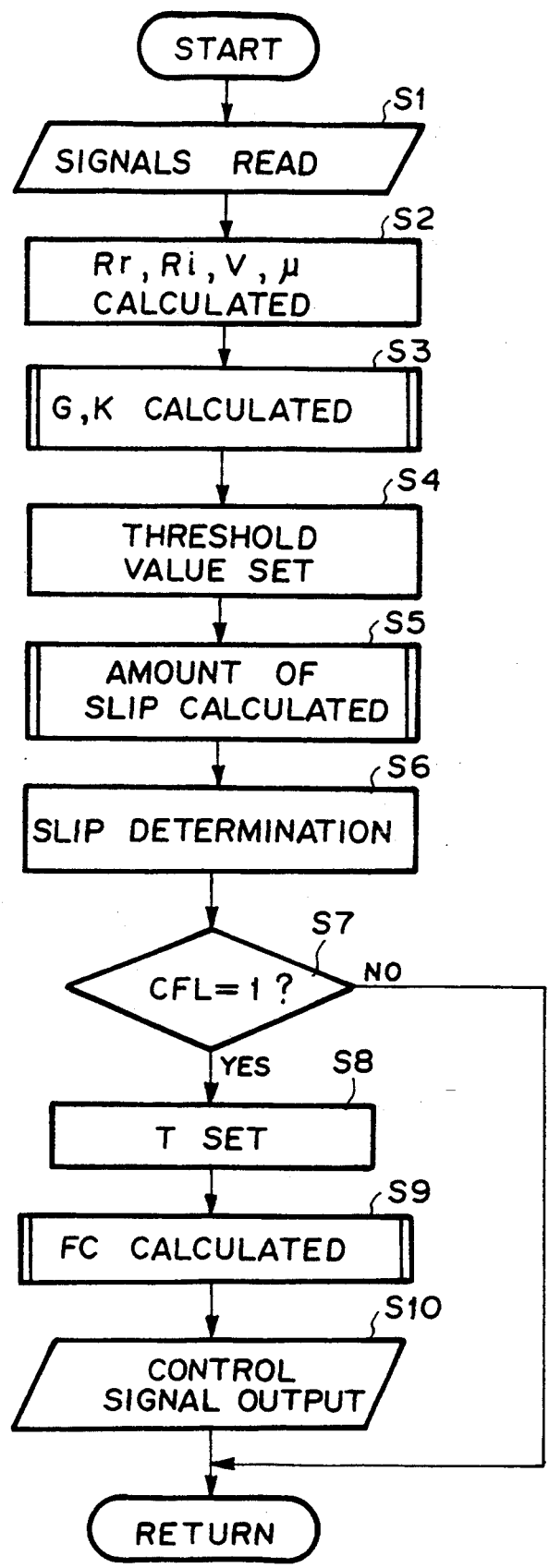
FIG. 2 is a flow chart for illustrating the routine of the slip control.
Figure 3:
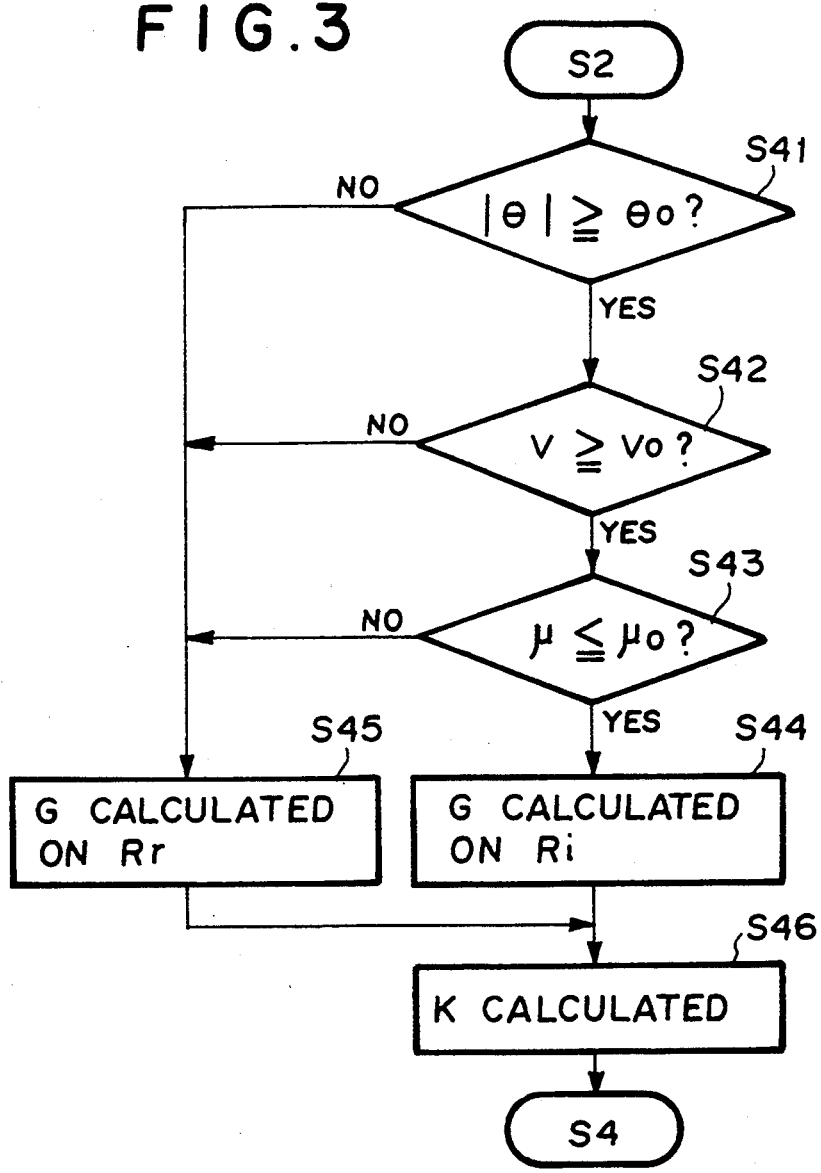
FIG. 3 is a flow chart for illustrating the routine of step S3 of the flow chart shown in FIG. 2.
Figure 4:
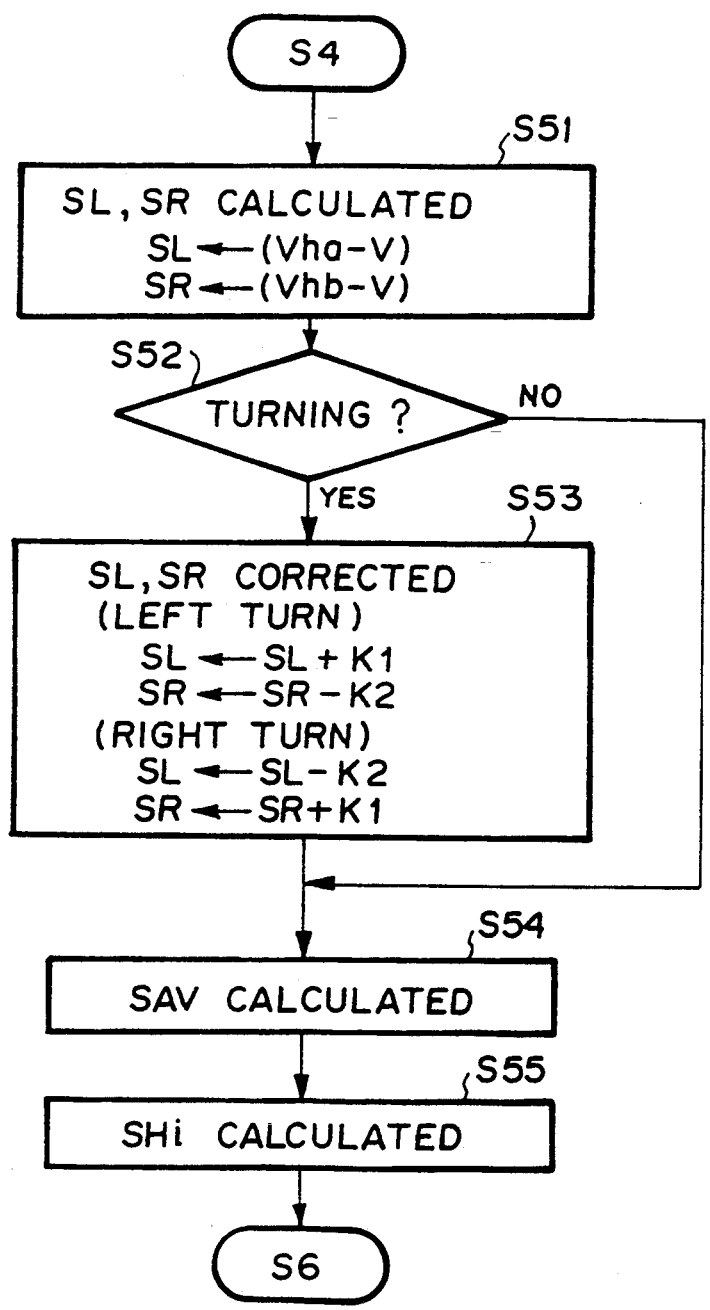
FIG. 4 is a flow chart for illustrating the routine of step S5 of the flow chart shown in FIG. 2.

In the flow chart shown in FIG. 2, the slip control is initiated in response to start of the engine 4, and the slip control section first reads the detecting signals such as representing the steering angle $\theta$ from the sensors described above. (step S1) Then in step S2, the slip control section calculates the actual radius of turn Rr, the steering-angle-based radius of turn Ri, the vehicle speed V and the friction coefficient $\mu$ of the road surface on the basis of the detecting signals. The actual radius of turn Rr is calculated according to the following formula (1) on the basis of the wheels speeds V1 and V2 of the driven wheels 3a and 3b detected by the wheel speed sensors 9c and 9d.

$$Rr = Min(V1, V2) \times Td \div |V1-V2| + 0.5Td \quad (1)$$

wherein Td represents the tread of the vehicle (e.g., 1.7m).

The steering-angle-based radius of turn Ri substantially corresponds to the radius of the circle on which the vehicle moves when the steering tendency is neutral and is obtained by linear interpolation from the following table 1 on the basis of the absolute value of the detected steering angle $\theta$.

TABLE 1

| $|\theta|$ | Ri(m) | $|\theta|$ | Ri(m) |
|---|---|---|---|
| 15° | 150 | 255° | 10 |
| 30° | 85 | 340° | 8 |
| 85° | 30 | 425° | 6 |
| 170° | 15 | 510° | 5 |

The vehicle speed V is determined as the higher of the wheel speeds V1 and V2 of the driven wheels 3a and 3b detected by the wheel speed sensors 9c and 9d.

The friction coefficient $\mu$ of the road surface is calculated on the basis of the vehicle speed V and the vehicle body acceleration Vg.

In the calculation of the friction coefficient $\mu$ of the road surface, a 100 msec-count timer and a 500 msec-count timer are used. Until 500 msec lapses after initiation of the slip control where the vehicle body acceleration Vg is not sufficiently large, the vehicle body acceleration Vg is calculated every 100 msec on the basis of the change in the vehicle speed V in the 100 msec according to the following formula (2). After 500 msec lapses after initiation of the slip control where the vehicle body acceleration Vg has become sufficiently large, the vehicle body acceleration Vg is calculated every 100 msec on the basis of the change in the vehicle speed V in each 500 msec according to the following formula (3). In the formulae (2) and (3), V(k) represents the present vehicle speed, V(k−100) represents the vehicle speed 100 msec before and V(k−500) represents the vehicle speed 500 msec before, with K1 and K2 respectively representing predetermined constants.

$$Vg = K1 \times \{V(k) \times V(k-100)\} \quad (2)$$

$$Vg = K2 \times \{V(k) \times V(k-500)\} \quad (3)$$

The friction coefficient $\mu$ of the road surface is calculated by three-dimensional interpolation according to the friction coefficient table shown in the following table 2 on the basis of the vehicle speed V and the vehicle body acceleration Vg thus obtained.

TABLE 2

| | \multicolumn{8}{c}{$0 \rightarrow Vg(g) \rightarrow$ increase} | | | | | | | |
|---|---|---|---|---|---|---|---|---|
| 0 | 1.0 | 1.0 | 2.0 | 2.0 | 3.0 | 3.0 | 4.0 | 4.0 | 5.0 |
| ↓ | 1.0 | 1.0 | 2.0 | 2.0 | 3.0 | 4.0 | 4.0 | 5.0 | 5.0 |
| ↓ | 1.0 | 1.0 | 2.0 | 3.0 | 3.0 | 4.0 | 4.0 | 5.0 | 5.0 |
| V(Km)/h | 1.0 | 2.0 | 3.0 | 4.0 | 4.0 | 5.0 | 5.0 | 5.0 | 5.0 |
| | 1.0 | 1.0 | 2.0 | 3.0 | 4.0 | 5.0 | 5.0 | 5.0 | 5.0 |
| ↓ | 1.0 | 1.0 | 2.0 | 4.0 | 4.0 | 5.0 | 5.0 | 5.0 | 5.0 |
| ↓ | 1.0 | 2.0 | 3.0 | 4.0 | 5.0 | 5.0 | 5.0 | 5.0 | 5.0 |
| high | 1.0 | 2.0 | 3.0 | 5.0 | 5.0 | 5.0 | 5.0 | 5.0 | 5.0 |

Then in step S3, the lateral acceleration G and the lateral-acceleration-based correction coefficient k are calculated. This routine will be described with reference to FIG. 3, hereinbelow.

The lateral acceleration G is determined according to the radius of turn and the vehicle speed V. In this embodiment, the actual radius of turn Rr and the steering-angle-based radius of turn Ri are selectively used as the radius of turn. That is, the degree of tendency of the vehicle to deviate from the line defined by the steering-angle-based radius of turn Ri is determined on the basis of the road surface condition and the driving condition, and when the degree of the tendency is high, the steering-angle-based radius of turn Ri is used while when the degree is low, the actual radius of turn Rr is used.

The slip control section determines whether the absolute value of the steering angle $\theta$ is not smaller than a predetermined value $\theta o$ in step S41 (FIG. 3), determines whether the vehicle speed V is not lower than a predetermined value Vo (step S42) and determines whether the friction coefficient $\mu$ of the road surface is not larger than a predetermined value $\mu o$ (step S43). When it is determined that the absolute value of the steering angle $\theta$ is not smaller than the predetermined value $\theta o$, the vehicle speed V is not lower than the predetermined value Vo and the friction coefficient $\mu$ of the road surface is not larger than the predetermined value $\mu o$, the lateral acceleration G is calculated on the basis of the steering-angle-based radius of turn Ri (step S44) and otherwise the lateral acceleration G is calculated on the basis of the actual radius of turn Rr. (Step S45) Then the slip control section calculates the lateral-acceleration-based correction coefficient k on the basis of the lateral acceleration G calculated in step S44 or S45. (step S46)

The lateral acceleration G is calculated on the basis of the radius of turn R (the steering-angle-based radius of turn Ri or the actual radius of turn Rr) and the vehicle speed V according to the following formula (4).

$$G = V \times V \times (1/R) \times (1/127) \quad (4)$$

In step S46, the lateral-acceleration-based correction coefficient k is calculated according to a correction coefficient table (table 3).

TABLE 3

| G(g) | k | G(g) | k |
|---|---|---|---|
| 0 | 1 | 0.7 | 0.6 |
| 0.1 | 0.9 | 0.9 | 0.5 |
| 0.3 | 0.8 | 1 | 0 |
| 0.5 | 0.7 | | |

Then the slip control section sets in step S4 (FIG. 2) the threshold value for determination of slip. The threshold value for determination of slip is set to the product of a base threshold value and the lateral-acceleration-based correction coefficient k. The base threshold value is calculated by three-dimensional interpolation according to a first base-threshold-value table shown in table 4 or a second base-threshold-valve table shown in table 5 on the basis of the vehicle speed V and the friction coefficient $\mu$ of the road surface. The first base-threshold-value table is for determining whether the slip control is to be initiated and the second base-threshold-value table is for determining whether the slip control is to be continued.

TABLE 4

| $\mu$ | \multicolumn{6}{c}{$0 \rightarrow V(Km/h) \rightarrow$ high} | | | | | |
|---|---|---|---|---|---|---|
| 1 | +10 | +9 | +7 | +6 | +5 | +4 |
| 2 | +11 | +10 | +9 | +8 | +7 | +6 |
| 3 | +12 | +11 | +10 | +9 | +8 | +7 |
| 4 | +13 | +12 | +11 | +10 | +9 | +8 |
| 4 | +14 | +13 | +12 | +11 | +10 | +9 |

TABLE 5

| $\mu$ | \multicolumn{6}{c}{$0 \rightarrow V(Km/h) \rightarrow$ high} | | | | | |
|---|---|---|---|---|---|---|
| 1 | +3 | +3 | +2 | +2 | +1 | +1 |
| 2 | +4 | +4 | +3 | +3 | +2 | +2 |
| 3 | +5 | +5 | +4 | +4 | +3 | +3 |
| 4 | +6 | +6 | +5 | +5 | +4 | +4 |
| 5 | +7 | +7 | +6 | +6 | +5 | +5 |

Then in step S5, the slip control section calculates the amount of slip.

In this step, the apparent amounts of slip SL and SR of the left and right front wheels 2a and 2b (the driving wheels) are calculated by subtracting the vehicle speed V from the wheel speeds Vha and Vhb of the respective front wheels. (step S51 in FIG. 4) Then it is determined whether the vehicle is making a turn on the basis of the detected steering angle $\theta$. (step S52) When it is determined that the vehicle is making a turn, the apparent amounts of slip SL and SR are corrected taking into account the difference in the rotational speed between the inner driving wheel and the outer driving wheel in the following manner. (step S53) That is, when the vehicle is making a left turn, SL is corrected to (SL+k1) and SR is corrected to (SR−k2), and when the vehicle is making a right turn, SL is corrected to (SL−k2) and SR is corrected to (SR+k1).

k1 is a slip correction value which is determined according to a k1 table (table 6) on the basis of the actual radius of turn Rr and the vehicle speed V and k2 is a slip correction value which is determined according to a k2 table (table 7) on the basis of the actual radius of turn Rr and the vehicle speed V. Because the vehicle speed V is not the average of the wheel speeds V1 and V2 of the driven wheels (the rear wheels) but the higher of the wheel speeds of the driven wheels, the slip correction values k1 and k2 for the inner and outer driving wheels differ from each other. Since the slip correction values k1 and k2 are set on the basis of the actual radius of turn Rr and the vehicle speed V, the amount of slip can be effected in time to the actual behavior of the vehicle.

TABLE 6

(k1 table)

| V(Km/h) | Rr(m) | | | | | |
|---|---|---|---|---|---|---|
| | 10 | 20 | 30 | 50 | 100 | 200 |
| 0 | 0 | 0 | 0 | 0 | 0 | 0 |
| 20 | 1.5 | 1.0 | 0.5 | 0.3 | 0.1 | 0 |
| 40 | 2.0 | 1.5 | 1.0 | 0.8 | 0.2 | 0 |
| 60 | 3.0 | 2.0 | 1.5 | 0.9 | 0.3 | 0 |
| 80~ | 3.5 | 2.5 | 2.0 | 1.2 | 0.4 | 0 |

TABLE 7

(k2 table)

| V(Km/h) | Rr(m) | | | | | |
|---|---|---|---|---|---|---|
| | 10 | 20 | 30 | 50 | 100 | 200 |
| 0 | 0 | 0 | 0 | 0 | 0 | 0 |
| 20 | 0.5 | 0.1 | 0 | 0 | 0 | 0 |
| 40 | 0.6 | 0.3 | 0.1 | 0 | 0 | 0 |
| 60 | 0.7 | 0.5 | 0.2 | 0 | 0 | 0 |
| 80~ | 0.8 | 0.7 | 0.3 | 0 | 0 | 0 |

After the correction of the amounts of slip SL and SR in the case where the vehicle is making a turn or when the vehicle is not making a turn, the average SAv of the amounts of slip SL and SR is calculated in step S53, and a maximum slip SHi is determined as the larger of the amounts of slip SL and SR in step S55.

In step S6, the slip control section performs determination of slip. The slip control section determines that the slip control is necessary when the following formula (5) is satisfied and sets slip flag SFL to 1.

$$SHi \geq \text{threshold value for determination of slip} \quad (5)$$

Figure 5:
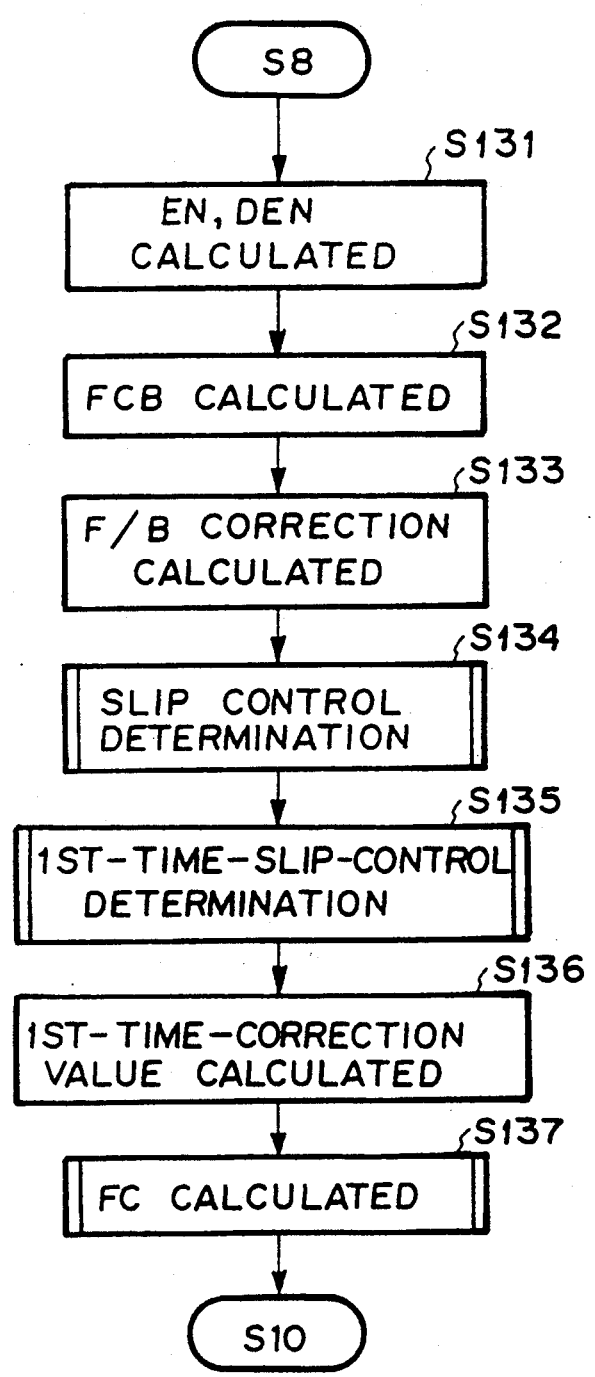
FIG. 5 is a flow chart for illustrating the routine of step S9 of the flow chart shown in FIG. 2.

When it has been determined that the slip control is not being effected (control flag CFL is 0) in step 134 shown in FIG. 5 (to be described later), the threshold value determined from the first base-threshold-value table shown in table 4 for determining initiation of the slip control is used as the threshold value for determination of slip, and when it has been determined that the slip control is being effected (flag CFL is 1) in step 134, the threshold value determined from the second base-threshold-value table shown in table 5 for determining continuation of the slip control is used as the threshold value for determination of slip.

Then in step S7, the slip control section determines whether control flag CFL is 1, and when it is determined that the control flag CFL is not 1(=0), that is, when it is determined that the slip control is not being effected, the slip control section immediately returns. On the other hand, when it is determined in step S7 that the slip control is being effected (the control flag CFL is 1), the slip control section sets the target control value T in step S8. The target control value T is a target value of the amounts of slip of the front wheels 2a and 2b, and is calculated by multiplying a base target control value by the lateral-acceleration-based correction coefficient k as shown by the following formula (6). The base target control value is calculated by three-dimensional interpolation according to a base-target-control-value table shown in table 8.

$$T = \text{base-target-control-value} \times k \quad (6)$$

TABLE 8

| μ | 0 → V(Km/h) → high | | | | | |
|---|---|---|---|---|---|---|
| 1 | +5.0 | +4.0 | +3.0 | +3.0 | +3.0 | +3.0 |
| 2 | +5.0 | +4.0 | +4.0 | +3.0 | +3.0 | +3.0 |
| 3 | +5.0 | +4.0 | +4.0 | +3.0 | +3.0 | +3.0 |
| 4 | +6.0 | +5.0 | +5.0 | +4.0 | +4.0 | +4.0 |
| 5 | +6.0 | +5.0 | +5.0 | +5.0 | +4.0 | +4.0 |

Then in step S9, the slip control section calculates the control level FC.

The control level FC is set within 0 to 15 by determining a base control level FCB on the basis of the deviation EN of the average SAv of the amounts of slip SL and SR from the target control value T and the rate of change thereof DEN and correcting the same taking into account a first-time-control correction and a feedback correction based on the preceding value FC(K−1) of the control value FC. The first-time-control correction is kept at +5 until the rate of change DSAv of the average SAv of the amounts of slip SL and SR is first reduced to 0 and at +2 until first-time-control flag STFL subsequently becomes 0. The routine in step S9 will be described in more detail with reference to the flow chart shown in FIG. 5.

The deviation EN of the average SAv of the amounts of slip SL and SR from the target control value T and the rate of change thereof DEN are first calculated according to the following formulae (7) and (8). (step S131)

$$EN = SAv(K) - T \quad (7)$$

$$DEN = DSAv = SAv(K) - SAv(K-1) \quad (8)$$

Then the base control level FCB is calculated according to a base-control-level table shown in table 9 on the basis of the deviation EN and the rate of change thereof DEN. (step S132)

TABLE 9

| | | DEN(g) | | | | | |
|---|---|---|---|---|---|---|---|
| | | − ← 0 → + | | | | | |
| | − | −3 | −2 | −1 | −1 | 0 | +1 | +1 |
| ↑ | | −3 | −1 | −1 | 0 | 0 | +1 | +1 |
| ↑ | | −2 | −1 | −1 | 0 | 0 | +1 | +1 |
| ↑ | | −2 | −1 | 0 | 0 | +1 | +1 | +1 |
| EN 0 | | −2 | −1 | 0 | 0 | +1 | +1 | +2 |
| (Km/h) | | −1 | −1 | 0 | 0 | +1 | +1 | +2 |
| ↓ | | | | | | | | |
| ↓ | | −1 | 0 | 0 | +1 | +1 | +1 | +2 |
| ↓ | | −1 | 0 | 0 | +1 | +1 | +1 | +3 |
| increase | | −1 | 0 | 0 | +1 | +1 | +2 | +3 |

In step S133, the preceding control level FC(K−1) is added to the base control level FCB thus obtained (the feedback correction) and in step S134, a slip-control determination is effected. Then a first-time-slip-control determination is effected in step S135 and a first-time-correction value for increasing the control level until the first slip determination is canceled is calculated in step 136.

Figure 6:
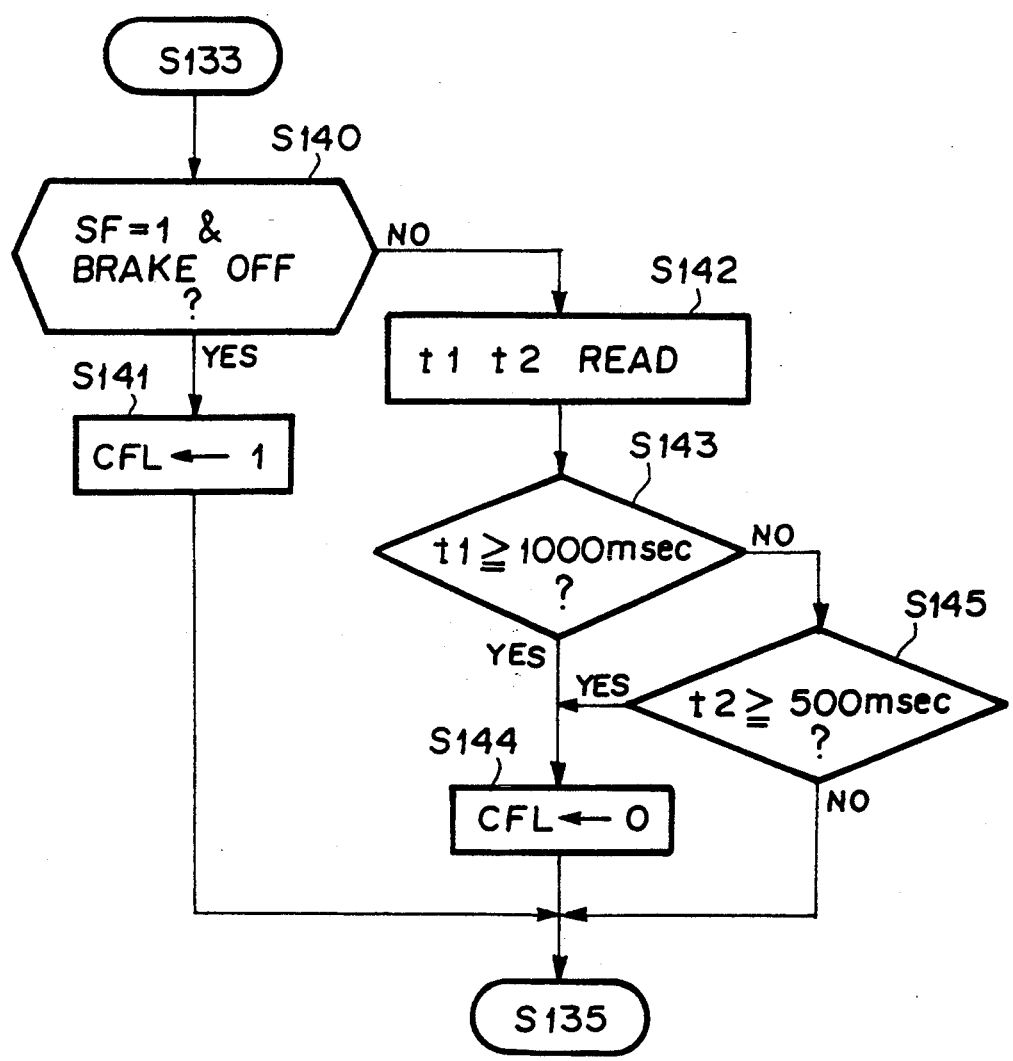
FIG. 6 is a flow chart for illustrating the routine of step S134 of the flow chart shown in FIG. 5.

The routine in step S134 will be described in more detail with reference to the flow chart shown in FIG. 6.

The slip control section determines whether the slip flag SFL is 1 and the brake has not been applied. (step S140) When it is determined that the slip flag SFL is 1 and the brake has not been applied, the control flag CFL is set to 1 to indicate that the slip control is being effected (step S141) and then the slip control section performs step S135. When it is not determined in step S140 that the slip flag SFL is 1 and the brake has not been applied, the count t1 of a first counter which is provided in the slip control section and counts the duration for which the slip flag SFL keeps at 0 and the count t2 of a second counter which is provided in the slip control section and counts the duration for which the condition, FC≦3, DSAv≦0.3 g, keeps being satisfied are read out in step S142. When the count t1 is not smaller than 1000 msec or when the count t2 is not smaller than 500 msec, the control flag CFL is reset to 0 and then the slip control section performs step S135.

Figure 7:
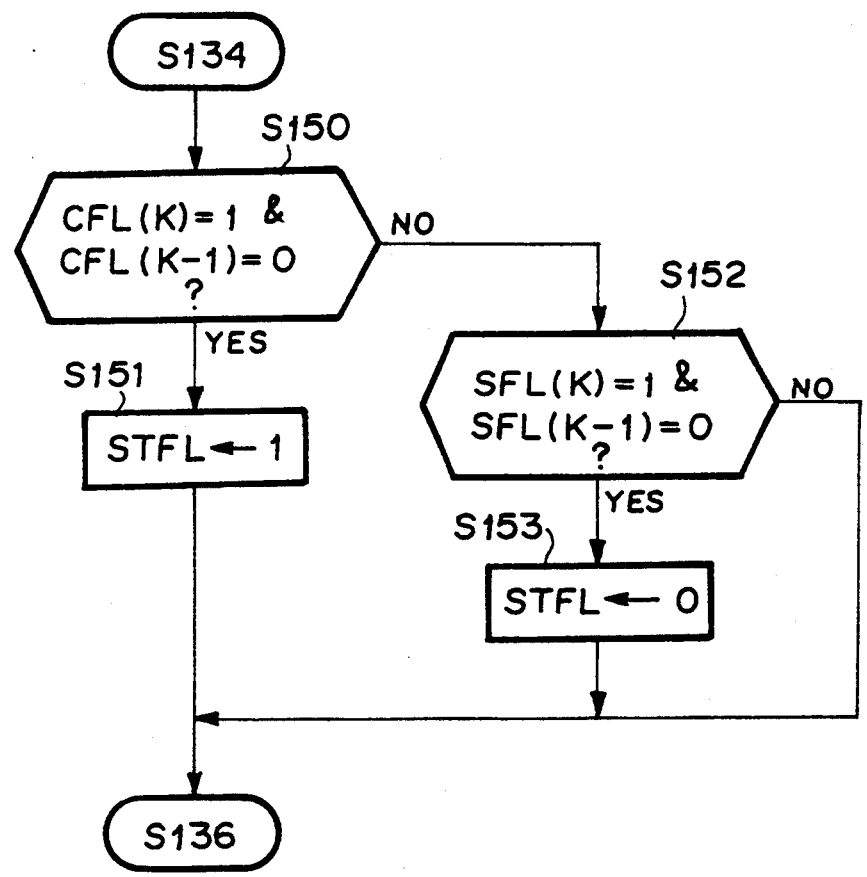
FIG. 7 is a flow chart for illustrating the routine of step S135 of the flow chart shown in FIG. 5.

The routine in step S135 will be described in more detail with reference to the flow chart shown in FIG. 7.

When the present control flag CFL(K) is 1 and at the same time the preceding control flag CFL(K−1) is 0 (step S150), the slip control section proceeds to step S136 after setting first-time-slip-control flag STFL to 1 in step S151. Otherwise the slip control section determines in step S152 whether the present slip flag SFL(K) is 0 and at the same time the preceding slip flag SFL(K−1) is 1. When it is determined that the present slip flag SFL(K) is 0 and at the same time the preceding slip flag SFL(K−1) is 1, the slip control section proceeds to step S136 after resetting the first-time-slip-control flag STFL to 0 in step S153. Otherwise the slip control section directly proceeds to step S136.

In step S136, the slip control section sets the first-time-correction value to +2 when the first-time-slip-control flag STFL is 1 and the rate of change DSAv of the average SAv of the amounts of slip SL and SR (formula 9) is smaller than 0.

In step S137, the slip control section sets a final control level FC(k) to one of the levels 0 to 15 by adding a feedback correction value based on the preceding control level FC(k−1) and the first-time-correction value (if necessary) to the base control level FCB.

In step S10 in FIG. 2, the slip control section outputs control signals to the engine control section. The control signals includes those for causing the engine control section to retard the ignition timing and for causing the same to effect fuel cut.

Figure 8:
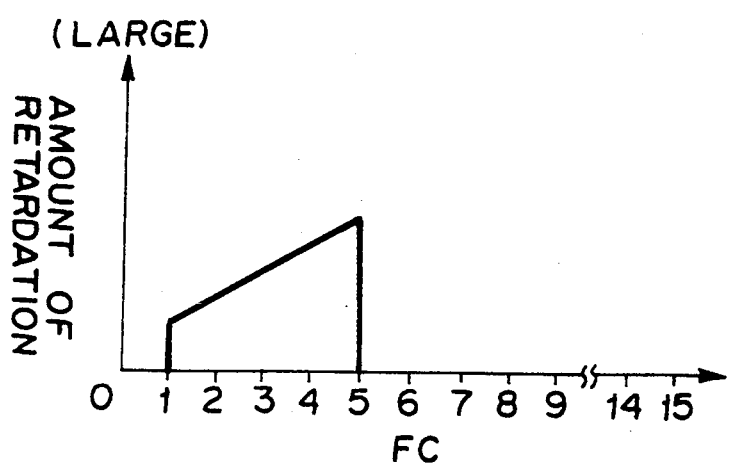
FIG. 8 is a map showing the relation between the control level and the amount of retardation of the ignition timing.
Figure 9:
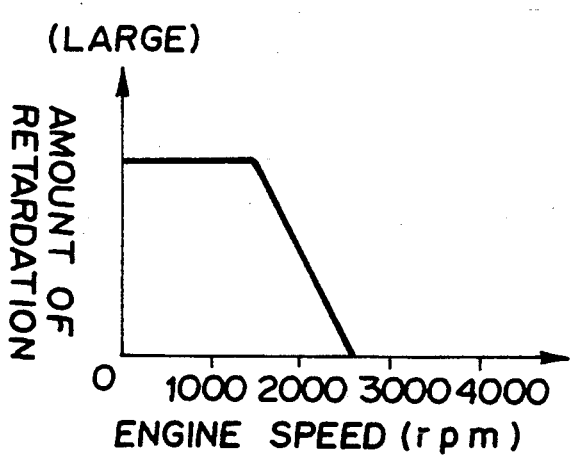
FIG. 9 is a map showing the relation between the engine speed and the amount of retardation of the ignition timing.
Figure 10:
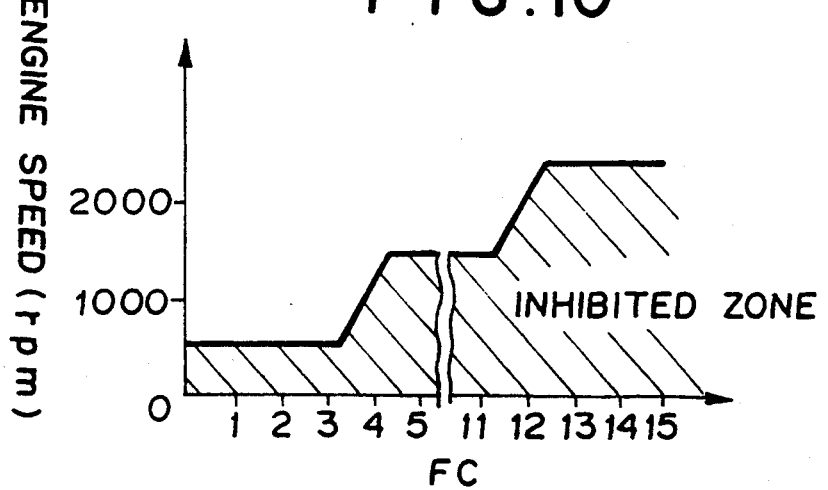
FIG. 10 is a view for illustrating the fuel cut inhibiting zone.
Figure 11:
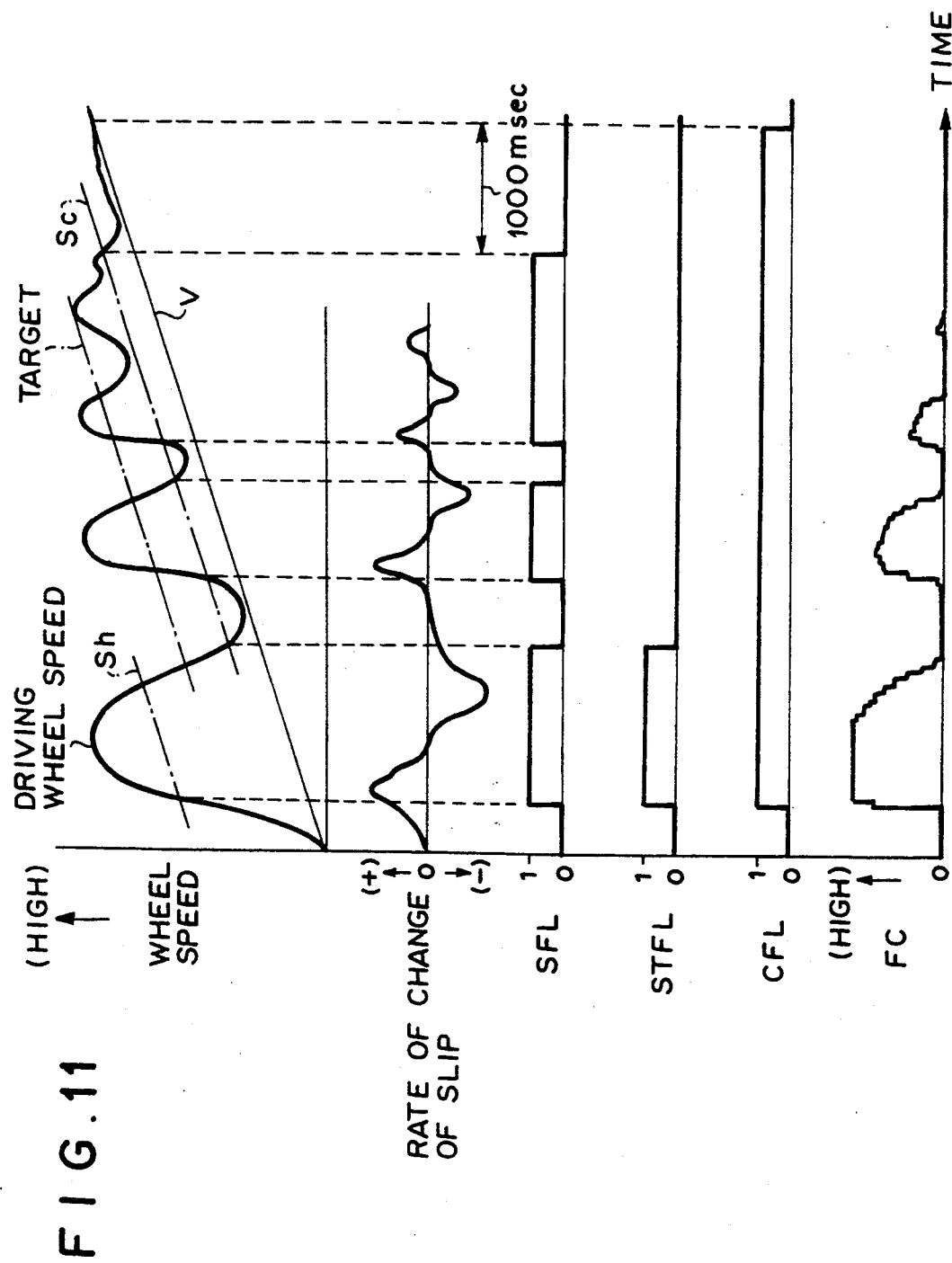
FIG. 11 is a time chart for illustrating the overall slip control action.

The ignition timing is retarded by an amount determined according to the map shown in FIG. 8 on the basis of the control level FC. In the high engine speed range, the maximum amount of the retardation of the ignition timing is limited based on the map shown in FIG. 9. The fuel cut is effected by selecting one of No. 1 to No. 12 patterns shown in table 10 (fuel cut table) on the basis of the control level FC. As the control level FC becomes higher, the larger number of pattern is selected. In table 8, "x" indicates that fuel injection from the injector is cut. In the engine speed range determined for each control level FC shown in FIG. 10, fuel cut is inhibited.

TABLE 10

| pattern No. | \multicolumn{12}{c}{injector number} | note |
|---|---|---|---|---|---|---|---|---|---|---|---|---|---|
| | 1 | 2 | 3 | 4 | 5 | 6 | 7 | 8 | 9 | 10 | 11 | 12 | |
| 0 | | | | | | | | | | | | | no fuel cut |
| 1 | x | | | | | | | | | | | | one C/L half cut |
| 2 | x | | | | | | x | | | | | | one C/L cut |
| 3 | x | | | x | | | x | | | | | | |
| 4 | x | | | x | | | x | | | x | | | two C/L cut |
| 5 | x | x | | x | | | x | | | x | | | |
| 6 | x | x | | x | | | x | x | | x | | | three C/L (one bank)cut |
| 7 | x | x | | x | x | | x | x | | x | | | |
| 8 | x | x | | x | x | | x | x | | x | x | | four C/L cut |
| 9 | x | x | x | x | x | | x | x | | x | x | | |
| 10 | x | x | x | x | x | | x | x | x | x | x | | five C/L cut |
| 11 | x | x | x | x | x | x | x | x | x | x | x | | |
| 12 | x | x | x | x | x | x | x | x | x | x | x | x | all C/L cut |

The operation of the slip control system can be summarized as follows. As shown in the time chart in FIG. 11, the threshold value Sh for determining whether the slip control is to be initiated is set relatively high according to the first base-threshold-value table and even if the wheel speed of the driving wheels increases due to external forces and the like, the slip control is not initiated so long as the wheel speed does not exceed the threshold value Sh. When the wheel speed of the driving wheels exceeds the threshold value Sh, the slip flag SFL is set to 1, and when the brake has not been applied, the control flag CFL and the first-time-slip-control flag STFL are set to 1 and the slip control is initiated.

When it is determined that the degree of understeer tendency is high during turning, the lateral acceleration G of the vehicle is calculated on the basis of the steering-angle-based radius of turn Ri. Since the steering-angle-based radius of turn Ri is smaller than the actual radius of turn Rr, the lateral acceleration G of the vehicle calculated on the basis of the steering-angle-based radius of turn Ri becomes larger and the correction coefficient k becomes smaller, which results in a relatively low threshold value Sh for determining whether the slip control is to be initiated. Accordingly, the slip control is initiated earlier and the driving torque of the driving wheels is suppressed earlier, whereby the understeer tendency can be prevented from becoming excessively high.

On the other hand, when the understeer tendency is relatively low, the lateral acceleration G of the vehicle is calculated on the basis of the actual radius of turn Rr. Accordingly, the threshold value Sh for determining whether the slip control is to be initiated and the target control value T are precisely corrected to conform to the actual lateral acceleration.

When the vehicle is running straight, the maximum slip SHi is determined as the larger of the apparent amounts of slip SL and SR and when the maximum slip SH exceeds the threshold value Sh, the slip control is initiated. When the vehicle is making a turn, the wheel speed of the outer wheel becomes greatly larger than that of the inner wheel and accordingly when the maximum slip SHi is determined on the basis of the wheel speed of the outer wheel, the slip control is initiated even if the actual amount of slip is smaller than the threshold value. In order to avoid this problem, the maximum slip SHi is determined to be the value obtained by subtracting the slip correction value k2 from the apparent amount of slip of the outer wheel in this embodiment, thereby preventing the slip control from being prematurely initiated.

Further since the actual turning behavior of the vehicle is slightly behind the change in the detected steering angle, there arises a problem that the correction of the detected amount of slip can be effected prematurely before the actual behavior of the vehicle when the slip correction values k1 and k2 are determined on the basis of the vehicle speed and the ideal radius of turn which is determined on the basis of the detected steering angle. In this embodiment, since the slip correction values k1 and k2 are determined on the basis of the vehicle speed and the actual radius of turn, the correction of the detected or apparent amount of slip can be effected in time to the actual behavior of the vehicle.

The average amount of slip SAv is calculated on the basis of the amounts of slip of the driving wheels and the target control value T is set on the basis of the vehicle speed V and the friction coefficient μ of the road surface. Then the base control level FCB is set on the basis the difference EN between the target control value T and the average amount of slip SAv and the rate of change DEN of the difference EN. Further the control level FC is calculated by adding the first-time-correction value to the base control level FCB, and the ignition timing and the fuel supply are controlled according to the control level.

When the maximum slip SH falls below the threshold value Sc for determining whether the slip control is to be continued, the first-time-control flag STFL is reset to 0, when the slip control is once interrupted. The threshold value Sc for continuation is set to be relatively low so that slip is surely converged.

Even if the higher of the wheel speeds of the driving wheels falls below the threshold value Sc for continuation, the control flag CFL is kept at 1 so long as the condition continues for at least one second, and when the wheel speed of the driving wheel increases again as a result of interruption of the slip control and exceeds the threshold value Sc for continuation, the slip flag SFL is set to 1 again and the slip control is resumed.

At this time, the first-time-control flag STFL is not set and the first-time-correction of the control level is not performed. Accordingly, the control level FC is set solely on the basis of the base control level, which is set on the basis of the difference NE and the rate of change DEN thereof, and thereafter the control level FC is set by adding the preceding value of the control level FC (feedback correction) to the base control level.

When the slip of the driving wheels is converged on the target value in this manner and the slip flag SFL comes to be kept at 0 more than one second, the control flag CFL is reset to 0 and one slip control cycle ends.

Though, in this embodiment, the apparent amounts of slip of the driving wheels SL and SR are corrected when the vehicle is making a turn (step S53 in FIG. 4), the wheel speeds Vha and Vhb may be instead corrected in the following manner. That is, when the vehicle is making a left turn, Vha is corrected to Vha+k1 and Vhb is corrected to Vhb−k2, while when the vehicle is making a right turn, Vha is corrected to Vha−k2 and Vhb is corrected to Vhb+k1.

What is claimed is;

1. A slip control system for a vehicle comprising a traction control means for effecting traction control in which an amount of slip of driving wheels of the vehicle relative to a road surface is detected and a torque transmitted to the road surface is controlled when the amount of slip of driving wheels exceeds a predetermined threshold value so that the amount of slip of driving wheels converges on a target value wherein the improvement comprises a wheel speed detecting means which detects wheel speeds of each of four wheels of the vehicle including driving wheels and driven wheels, a slip calculating means which calculates amounts of slip of the driving wheels on a basis of said wheel speeds detected by the wheel speed detecting means, a correction value calculating means which, when the vehicle is making a turn, calculates a vehicle speed and an actual radius of turn on a basis of said wheel speeds of the driven wheels detected by the wheel speed detecting means and calculates, on a basis of the actual radius of the turn and the vehicle speed thus obtained, correction values for correcting an amount of slip of an inner driving wheel and an amount of slip of an outer driving wheel calculated by the slip calculating means taking into account a difference between a wheel speed of the inner driving wheel and that of the outer driving wheel during turning, and a correcting means which respectively corrects the amount of slip of the inner driving wheel and the amount of slip of an outer driving wheel calculated by the slip calculating means with the correction values calculated by the correction value calculating means.

2. A slip control system as defined in claim 1 further comprising a lateral acceleration calculating means which calculates an ideal radius of turn on a basis of a steering angle detected by a steering angle sensor, calculates said vehicle speed on a basis of said wheel speeds detected by the wheel speed detecting means and calculates a lateral acceleration of the vehicle on a basis of said ideal radius of turn and said vehicle speed thus calculated, and a lateral-acceleration-based correcting means which calculates a correction coefficient on a basis of the lateral acceleration calculated by the lateral acceleration calculating means and corrects a threshold value and a target value for traction control with the correction coefficient when the vehicle is in a predetermined running condition where the vehicle is apt to be unstable.

3. A slip control system as defined in claim 2 further comprising a lateral acceleration calculating means which selects, according to a condition of a road surface and a running condition of the vehicle, one of an ideal radius of turn calculated on a basis of a steering angle detected by a steering angle sensor and an actual radius of turn calculated on the basis of said wheel speeds of the driven wheels detected by the wheel speed detecting means, calculates a vehicle speed on a basis of the wheel speeds detected by the wheel speed detecting means, and calculates a lateral acceleration of the vehicle on a basis of a selected radius of turn and the vehicle speed thus calculated, said threshold value and the target value for the traction control being determined on a basis of the lateral acceleration thus determined.

4. A slip control system as defined in claim 3 in which said lateral acceleration calculating means selects said ideal radius of turn when it is determined that an understeer tendency of the vehicle is high according to said condition of said road surface and said running condition of the vehicle, and otherwise selects the actual radius of turn.

5. A slip control system as defined in claim 4 in which said lateral acceleration calculating means selects said ideal radius of turn when an absolute value of said detected steering angle is not smaller than a first predetermined value, and said vehicle speed is not lower than a second predetermined value and a friction coefficient $\mu$ of the road surface is not larger than a third predetermined value.

6. A slip control system as defined in claim 1 in which said vehicle speed is calculated on a basis of a left driven wheel speed or a right driven wheel speed, whichever is highest.

7. A slip control system as defined in claim 6 in which a correction value for correcting said amount of slip of an outer driving wheel is larger a correction value for correcting said amount of slip of an inner driving wheel.

8. A slip control system for a vehicle comprising a traction control means for effecting traction control in which an amount of slip of the driving wheels of the vehicle relative to a road surface is detected and a torque transmitted to the road surface is controlled when the amount of slip of driving wheels exceeds a predetermined threshold value so that the amount of slip of driving wheels converges on a target value wherein the improvement comprises wheel speed sensors which detect wheel speeds of each of four wheels of the vehicle including driving wheels and driven wheels, and a microcomputer which calculates amounts of slip of the driving wheels on a basis of wheel speeds detected by the wheel speed sensors, calculates, on a basis of an actual radius of turn and a vehicle speed calculated on a basis of wheel speeds of the driven wheels detected by the wheel speed sensors, correction values for correcting an amount of slip of an inner driving wheel and an amount of slip of an outer driving wheels taking into account a difference between a wheel speed of the inner driving wheel and that of the outer driving wheel during turning, and corrects the amounts of slip of an inner driving wheel and the amount of slip of an outer driving wheel with respective correction values.

* * * * *

UNITED STATES PATENT AND TRADEMARK OFFICE
CERTIFICATE OF CORRECTION

PATENT NO.  : 5,407,023
DATED       : April 18, 1995
INVENTOR(S) : Tetsuhiro YAMASHITA et al.

It is certified that error appears in the above-identified patent and that said Letters Patent is hereby corrected as shown below:

On the title page, item:
    [75]   Inventors:  Tetsuhiro YAMASHITA; Kohji HIRAI, both of Hiroshima, JAPAN Signed and Sealed this Twelfth Day of September, 1995

Attest:

BRUCE LEHMAN

*Attesting Officer*    *Commissioner of Patents and Trademarks*